Patented Mar. 14, 1944

2,344,319

UNITED STATES PATENT OFFICE 2,344,319

METHOD FOR THE PURIFICATION OF TITANIUM TETRACHLORIDE

Walter F. Meister, Elizabeth, N. J., assignor to National Lead Company, New York, N. Y., a corporation of New Jersey No Drawing. Application September 11, 1942, Serial No. 457,970

5 Claims. (Cl. 23—87)

This invention relates to the purification of titanium tetrachloride.

Titanium tetrachloride in its pure form is a water-white liquid. The commercial products, however, which are obtained by chlorination of various available titaniferous materials, such as rutile, or residues obtained from the extraction of iron from titaniferous iron ores, or of titaniferous iron ores themselves, are invariably contaminated with impurities which are carried over with the titanium chloride vapors during the chlorination process. The crude condensate of titanium tetrachloride usually has a strong yellowish color.

The magnitude and type of contaminants which will be found in the condensed vapors from the chlorination operation will depend upon the purity of the titaniferous material used and the method of chlorination.

A study of the chlorides of the elements of the various groups of the periodic system reveals that there are a number of elements besides titanium which may be reacted with chlorine to form volatile chlorides which will be carried over with the titanium tetrachloride vapors during the chlorination operation. Some of these chlorides may be more or less easily separated from the titanium tetrachloride condensate; those that are in solid form at ordinary temperatures and insoluble in the tetrachloride by settling and filtration, or both, and those which are miscible with the tetrachloride by fractional distillation. However, a separation of solid chlorides from titanium tetrachloride seldom effects complete removal of the chlorides and depending upon the solubility of the respective chlorides they will be found in varying amounts as impurities in the titanium tetrachloride. Such impurities are not readily eliminated by distillation treatments because they tend to carry over with the vapors of titanium tetrachloride. Furthermore, fractional distillation to remove miscible chlorides is not completely satisfactory because depending upon the vapor pressure of the respective chlorides they will tend to distil over with the titanium tetrachloride and be found in the condensate. One such chloride which, because of the proximity of its boiling point to that of titanium tetrachloride, cannot be separated by fractional distillation is vanadium chloride. Among the chlorides of other elements which tend to distil over with the titanium tetrachloride may be mentioned those of silicon, phosphorus, antimony and sulfur. Many of the contaminating chlorides which, for the foregoing reasons, may be found in titanium tetrachloride, impart discoloration. This is particularly true of vanadium tetrachloride.

That the discoloring impurities cannot be eliminated from titanium tetrachloride by straight fractional distillation is well-known, and various treatments for the elimination of such impurities, including vanadium, have been proposed in the prior art. Thus, purification of titanium tetrachloride has been carried out by treatment with certain metals alone, such as iron in powder form, or with sodium amalgam prior to distillation. It has, however, been found that such treatments are not entirely satisfactory, repeated treatments and distillations being necessary for a substantially complete removal of these impurities.

Other purifying treatments for titanium tetrachloride, such as with di- and trichloride of titanium, activated carbon, activated inorganic compounds such as alumina, silica, or titanium dioxide, and certain organic compounds capable of polymerization have recently been disclosed in the art.

It has now been discovered, according to the present invention, that impure titanium tetrachloride may be decolorized and purified to form a pure water-white liquid in a single treatment and single distillation by contacting with a hydrated iron sulfate which will yield water of hydration at temperatures below the boiling point of titanium tetrachloride.

Accordingly, it is among the objects of the present invention to produce in a single distillation a clear water-white pure titanium tertachloride. Other objects will be apparent from the following description.

According to the present invention, the crude, impure titanium tetrachloride is mixed with a small amount of hydrated ferrous sulfate which will yield water of hydration at temperatures below the boiling point of titanium tetrachloride and the mixture heated under a reflux condenser at normal pressure. After sufficient time has elapsed, for the treatment to take effect, the titanium tetrachloride is recovered by a single distillation. The distilled liquid is water-white and free of impurities.

The hydrated ferrous sulfates which are suitable for the practice of the invention are those which contain above one molecule of water of hydration. Thus, hydrated ferrous sulfate commonly known as copperas which generally contains about five or more molecules of water of hydration is particularly well adapted for use in the present invention and, if desired, the relatively pure heptahydrate, $FeSO_4.7H_2O$, may be used with especially good results. Anhydrous ferrous sulfate and monohydrate cannot be used as such in the practice of the invention but if these compounds are treated with water to produce a degree of hydration which, at temperatures below the boiling point of titanium tetrachloride, i. e. about 136° C., yield water of hydration, such resulting hydrated forms may be used.

In order to facilitate the operation, mechanical agitation may be employed, or dry inert gases may be bubbled through the liquid during the iron sulfate treatment and subsequent distillation. Suspended and colloidal matter and occluded gases which have not otherwise been removed should preferably be substantially eliminated by, for example, fractional distillation prior to the iron sulfate treatment. Because of the reactivity of titanium tetrachloride vapors with water, it is preferable to carry out the distillation in a dry atmosphere.

If so desired the iron sulfate treatment may be carried out under more than atmospheric pressure. In that case, gaseous reaction products should preferably be eliminated prior to the application of pressure.

The time and temperature of the treatment required depends upon the amount of impurities present in the liquid and the amount of treating agent used. Ordinarily when contacting the crude titanium tetrachloride with the iron sulfate at normal pressure at a temperature at or about the temperature of boiling, i. e., about 136° C., a treatment time of from about one hour to about six hours is sufficient with an amount of treating agent, e. g., ferrous sulfate heptohydrate equal to from about 5 grams $FeSO_4$ to about 10 grams of $FeSO_4$ per liter of liquid. The treatment of this invention is very efficient and a recovery of more than 95 percent of the titanium tetrachloride is attained in the single treatment and distillation.

The iron sulfate residue containing the impurities which have been removed from the titanium tetrachloride may be treated for the recovery of possible remaining titanium tetrachloride and residual values, such as those of non-distillable titanium compounds and other impurities, e. g., vanadium.

Having in the foregoing broadly described my invention, I shall now proceed to illustrate its working with the aid of actual examples.

Four portions of discolored commercial titanium tetrachloride containing 0.15 percent vanadium calculated on the $TiO_2$ basis were placed in four separate glass distillation apparatus and refluxed at about 136° C. in contact with ground copperas in amounts as shown in Table I, and then distilled at normal pressure out of contact with materials other than glass and away from contact with the outside atmosphere.

The distillates were tested for vanadium which is the most objectionable discoloring impurity and their color was noted.

The following Table I contains the results obtained:

| Exp. No. | Crude $TiCl_4$ | Ground copperas | Refluxing time at 136° C. | Color of distillate | Content of vanadium in distillate calculated on $TiO_2$ |
|---|---|---|---|---|---|
| | Parts by weight | Parts by weight | Hours | | Per cent |
| 1 | 212.5 | 1.3 | 4 | Water-white | .002 |
| 2 | 212.5 | 1.3 | 4 | do | .002 |
| 3 | 212.5 | 1.9 | 4 | do | .001 |
| 4 | 212.5 | 1.9 | 2 | do | .003 |

The invention has in the foregoing been described in connection with certain details of operation and specific examples; it is, however, not intended that such description and examples shall be interpreted as imposing limitations upon its scope except insofar as they are not included in the accompanying claims, which should be interpreted as broadly as possible.

The invention has been described with reference to the treatment of titanium tetrachloride, but it should be understood that the other titanium halides, titanium tetrabromide and titanium tetrafluoride, may be purified in a similar manner.

I claim:
1. Method for purifying titanium tetrachloride which comprises admixing with crude titanium tetrachloride a small amount of a hydrated ferrous sulfate which yields water of hydration at temperatures below about 136° C., boiling the mixture under refluxing conditions and then distilling the so-treated titanium tetrachloride.

2. Method for purifying titanium tetrachloride which comprises admixing with crude titanium tetrachloride an amount of a hydrated ferrous sulfate which yields water of hydration at temperatures below about 136° C. between about five grams and about ten grams, calculated as ferrous sulfate, $FeSO_4$, per liter of tetrachloride, boiling the mixture under refluxing conditions and then distilling the so-treated titanium tetrachloride.

3. Method for purifying titanium tetrachloride which comprises admixing with crude titanium tetrachloride an amount of ferrous sulfate heptahydrate between about five grams and about ten grams, calculated as ferrous sulfate, $FeSO_4$, per liter of tetrachloride, boiling the mixture under refluxing conditions and then distilling the so-treated titanium tetrachloride.

4. Method for purifying titanium tetrachloride which comprises admixing with crude titanium tetrachloride an amount of copperas between about five grams and about ten grams, calculated as ferrous sulfate, $FeSO_4$, per liter of tetrachloride, boiling the mixture under refluxing conditions and then distilling the so-treated titanium tetrachloride.

5. Method for purifying titanium tetrachloride which comprises admixing with crude tetrachloride an amount of ferrous sulfate heptahydrate between about five grams and about ten grams, calculated as ferrous sulfate, $FeSO_4$, per liter of tetrachloride, boiling the mixture under refluxing conditions between about one hour and about six hours, then distilling the so-treated titanium tetrachloride.

WALTER F. MEISTER.